United States Patent [19]

van de Moesdijk

[11] 4,246,250

[45] Jan. 20, 1981

[54] PROCESS FOR THE PREPARATION OF A HYDROXYLAMINE SALT

[75] Inventor: Cornelis G. M. van de Moesdijk, Elsloo, Netherlands

[73] Assignee: Stamicarbon, B.V., Geleen, Netherlands

[21] Appl. No.: 67,915

[22] Filed: Aug. 17, 1979

[30] Foreign Application Priority Data

Aug. 17, 1978 [NL] Netherlands ..................... 7808519

[51] Int. Cl.$^3$ ............................................. C01B 21/14
[52] U.S. Cl. ................................................ 423/387
[58] Field of Search ..................................... 423/387

[56] References Cited

U.S. PATENT DOCUMENTS 2,827,363  3/1958  Marhofer ........................ 423/387

FOREIGN PATENT DOCUMENTS 1177118  9/1964  Fed. Rep. of Germany ........... 423/387

Primary Examiner—O. R. Vertiz
Assistant Examiner—Wayne A. Langel
Attorney, Agent, or Firm—Cushman, Darby & Cushman

[57] ABSTRACT

A process is described for the production of hydroxylamine, or hydroxylamine salts, from the reduction of nitrogen monoxide with hydrogen in an acid liquid reaction medium in one reactor in the presence of a noble-metal catalyst, wherein explosive gaseous mixture compositions are avoided by maintaining the presence of an inert gas at a level of between 10% and 80% by volume, and whereby the process is conducted at elevated pressures of between about 1500 and 5000 kPa.

3 Claims, No Drawings

PROCESS FOR THE PREPARATION OF A HYDROXYLAMINE SALT

This invention relates to a process for the preparation of a hydroxylamine salt by reducing nitrogen monoxide with hydrogen in an acid liquid reaction medium in one reactor in the presence of a noble-metal catalyst, with recirculation of part of gaseous mixture discharged from the reactor. A process of this general type is already known from British Patent Specification No. 1,463,857.

The reaction of nitrogen monoxide and hydrogen produces not only hydroxylamine, but also small amounts of $N_2O$. The expensive starting material nitrogen monoxide is preferably converted as much as possible into hydroxylamine. Therefore, the gas discharged from the reactor is recycled, and thus the concentration of the by-product $N_2O$ in the gaseous mixture introduced into the reactor will continue to build-up very significantly.

Mixtures of hydrogen, nitrogen monoxide and $N_2O$ are, however, explosive in certain proportions. For this reason, special measures have to be taken to prevent the gaseous mixture from reacting the explosive composition, all the more so since the noble-metal catalyst normally used in said process can function as sources of ignition.

One possibility of avoiding explosive gas mixtures is the use of pure nitrogen monoxide and hydrogen, and converting the nitrogen monoxide in at least two separate reactors at low pressures (500–800 kPa) and maintaining low $H_2/NO$ ratios. The $N_2O$ in the gaseous mixture may then be fully reduced, or at least partly so, to molecular nitrogen. Disadvantages of this method include, however, the fact that several reactors are then needed, which requires a high cost of investment to produce a commercially acceptable amount of hydroxylamine. Careful control of the process gas mixture is also necessary.

At higher $N_2$ and NO pressures higher reaction rates can be reached, and therefore the process could be efficiently effected in one reactor. At such higher partial pressures, however, the process is even more critical, as a gaseous mixture of explosive composition will very soon be formed, particularly at high degrees of conversion of NO. Consequently, this possibility is ruled out in the prior art, if no special measures are taken.

The object of the present invention is to provide an improved process for the preparation of hydroxylamine within a single reactor in which the above drawbacks do not occur.

The process according to the invention is characterized in that during the said reduction process a gaseous feedstock is introduced so that the gaseous reaction mixture is maintained with about 10 to 80% by volume of inert gas, and the total pressure ranges between 1500 and 5000 kPa. Preferably, the total pressure ranges between 2000 and 3500 kPa. The partial pressures of hydrogen and nitrogen monoxide are maintained so as to be, usually, in the range between about 350 and 1650 kPa and between about 50 and 160 kPa, respectively, although pressures outside these ranges may also be used.

This composition of the gas mixture present during the reduction corresponds, practically, with the composition of the gas mixture which is then discharged from the reactor.

Surprisingly, it has been found that, as a result of this invention, no gaseous mixture of an explosive composition can form, while at the same time a maximum conversion of nitrogen monoxide can be achieved. This is all the more surprising, considering that without the presence of inert gas such gaseous mixture would be explosive owing to the proportions formed between the nitrogen monoxide, hydrogen and $N_2O$.

It should be noted, that a small amount of inert gas is, of course, present in the reactor in the process described in the above-mentioned British Patent Specification. This inert gas has formed as a by-product in the preparation of nitrogen monoxide by oxidation of $NH_3$. However, the amount thereof is very small (below at most about 5% by volume). With so small an amount of inert gas, the preparation of hydroxyl amine at elevated pressures is not to be recommended, as then the gaseous mixtures can then still become explosive at higher degrees of NO conversions.

A further important advantage of the process according to this invention is that the hydrogen and especially the nitrogen monoxide feedstock need not be extremely pure, which by contrast is necessarily so in the prior art processes without recirculation and with the use of more than one reactor. This yields a considerable saving for the overall process, as the preparation of very pure nitrogen monoxide is very expensive.

The particular inert gases used in the process according to this invention is not critical. Use may be made of any gas that is known not to affect the reaction and not to form an explosive mixture with the gases present under the conditions used. Examples of such gases are nitrogen, carbon dioxide and noble gases such as helium or argon.

The temperature employed during the preparation of the hydroxylamine may be varied within the usual limits for this preparation. Use is preferably made of temperatures of between about 40° and 100° C.

The catalyst may be any of the well-known nobel-metal catalysts. Use is preferably made of a catalyst that contains platinum and/or palladium and which has been enriched with well-known substances for improving the selectivity, such as lead, selenium, arsenic, tellurium, sulphur, or compounds of these elements.

The process according to this invention may also be used for the preparation of various hydroxylamine salts, especially hydroxylammonium phosphate. These salts find use mainly as starting materials in the oximation of cycloalkanones to cycloalkanone oximes, particularly cyclohexanone oxime. Cyclohexanone oxime can be rearranged into caprolactam, from which nylon-6 is prepared. Consequently, the process according to the invention will most commonly be effected in combination with an oximation process that is in itself already known.

The invention will now be further elucidated, and understood, by reference to the following Examples.

EXAMPLE I

A 5 liter-autoclave (Cr-Ni-steel 18-8) provided with a stirrer was fed with 2 liters of phosphoric acid (20% by weight), which contained 10 mg of Se (added as $SeO_2$) and 5 g of a platinum-on-carbon catalyst (5% by weight of Pt). $H_2$ gas was passed through this mixture for half an hour.

Next, a gaseous mixture of $H_2$, NO and $N_2$ was passed through the mixture for 1 hour at a temperature of 30° C.

The percentage of inert gas in the autoclave was maintained at about 50% by volume. The pressure in the reactor was kept constant at 2000 kPa. The vent gas was analyzed and contained 50% by volume of $N_2$, 3.2% by volume of NO, 43.8% by volume of $H_2$ and 3% by volume $N_2O$. The liquid obtained after 1 hour contained 1.2 moles of hydroxylamine per kg and 0.06 mole of $NH_3$ per kg. Calculated to the amount of NO converted, this means a selectivity of 84.3% of the theoretical amount of hydroxylamine.

The gaseous mixture in the reaction was not explosive.

EXAMPLES II-IV

A number of experiments were carried out in a comparable way to Example I. The results are listed in the Table below.

| Example | g cat/l | mgSe/g cat. | Temp. °C. | NO Conversion % | $NH_2OH$ Prod. mol/l/h | mol $NH_2OH$ mol NO geconverted % | P kPa | Vent Gas Composition | | | |
|---|---|---|---|---|---|---|---|---|---|---|---|
| | | | | | | | | NO Vol.% | $H_2$ Vol.% | $N_2O$ Vol.% | $N_2$ Vol.% |
| II | 0.30 | 1.30 | 50 | 70 | 0.43 | 78.8 | 2000 | 2.63 | 45.5 | 0.16 | 52.1 |
| III | 1.25 | 2.10 | 48 | 85 | 1.24 | 83.1 | 1500 | 3.7 | 61.1 | 0.08 | 35.8 |
| IV | 2.50 | 2.10 | 55 | 87 | 1.60 | 85.2 | 2000 | 7.9 | 79.2 | 0.12 | 11.3 |

EXAMPLE V

An autoclave of the type used in Example I, but also provided with filter candles and an acid feed, was used for the continuous production of a solution containing hydroxylamine salt. The catalyst used was platinum on carbon (1% by weight of Pt) in a concentration of 30 g per liter, to which 1.5 mg of Se, as $SeO_2$, per gram of catalyst had been added before use. Furthermore, the catalyst had previously been activated with $H_2$ for one hour. The total pressure was kept at 2500 kPa, while a $H_2/N_2/NO$ mixture was a volumetric $H_2$/NO ratio of 1.75 was fed continuously to the autoclave. The temperature in the autoclave was kept at 45° C. The gaseous mixture discharged from the autoclave contained, on an average, 3.5% by volume of NO and 25.1% by volume of $H_2$ with some residual $N_2$ containing a small amount of $N_2O$. The percentage of inert gas in the autoclave was 68.9% by volume. The autoclave was continuously fed with a 27% by weight solution of phosphoric acid containing 0.3-0.5 mole of $NH_4NO_3$ per kg of solution, while a solution containing hydroxylamine salt was continuously removed from the autoclave through the filter candles. The NO conversion varied slightly, but was 85-90%, on the average, while an average hydroxylamine selectivity of 80-83% based on ON converted was achieved. The by-product formed was about 11% of $NH_4^+$ and 6% of $N_2O$. The experiment was continued for fourteen days, in which, while the yield per unit space and time was considerably higher at first than the average value, after an initial rapid drop stabilized at a level of about 1000 moles of hydroxylamine per $m^3$ of autoclave volume per hour. The resulting liquid contained 1.2 moles of hydroxylamine and 0.7-0.85 mole of $NH_4^+$ per kg.

What is claimed is:

1. In a process for the preparation of a hydroxylamine salt by reaction of nitrogen monoxide with hydrogen in an acid liquid reaction medium, and in the presence of a noble-metal catalyst suspended in the reaction medium, with recirculation of part of the gaseous mixture discharged from the reactor, the improvement wherein said reaction is conducted in a single reactor zone and during the said reduction a gaseous reaction mixture is maintained with from 10 to 80% by volume of inert gas, while the total pressure ranges between 1000 and 5000 kPa whereby hydroxylamine is produced and the gaseous reaction mixture is non-explosive.

2. The process according to claim 1, wherein the total pressure ranges between 1500 and 3500 kPa during the reduction.

3. The process according to either of the claims 1 and 2, wherein during the reduction the partial pressure of the hydrogen ranges between 350 and 1650 kPa and the partial pressure of the nitrogen monoxide ranges between 50 and 160 kPa.

* * * * *